United States Patent [19]

DeMild, Jr.

[11] Patent Number: 4,741,354

[45] Date of Patent: May 3, 1988

[54] RADIAL GAS MANIFOLD

[75] Inventor: Leonard C. DeMild, Jr., Peabody, Mass.

[73] Assignee: Spire Corporation, Bedford, Mass.

[21] Appl. No.: 34,615

[22] Filed: Apr. 6, 1987

[51] Int. Cl.⁴ ........................ F16K 11/10; F16K 49/00

[52] U.S. Cl. .................................... 137/240; 118/719; 137/341; 137/606; 137/897

[58] Field of Search ................ 118/719, 900; 137/240, 137/341, 606, 896, 897

[56] References Cited

U.S. PATENT DOCUMENTS

| | | | |
|---|---|---|---|
| 3,373,762 | 3/1968 | Korchak | 137/606 X |
| 3,670,768 | 6/1972 | Griswold | 137/606 |
| 3,924,651 | 12/1975 | Hippel et al. | 137/606 X |
| 4,008,736 | 2/1977 | Wittmann-Liebold | 137/606 |
| 4,168,724 | 9/1979 | Graffunder et al. | 137/606 |
| 4,558,845 | 12/1985 | Hunkapiller | 137/606 X |
| 4,596,208 | 6/1986 | Wolfson et al. | 118/712 |
| 4,597,412 | 7/1986 | Stark | 137/606 |

*Primary Examiner*—Gerald A. Michalsky
*Attorney, Agent, or Firm*—Morse, Altman, Dacey & Benson

[57] ABSTRACT

An improved radially designed gas manifold is disclosed for the precise mixing and admission of a plurality of gases into a processing chamber, and being characterized by rapid switching from one gas to another or from one set of gas mixture to another set of gas mixture, and yet occupying a minimum of dead space. The radial gas manifold includes a body provided with an axial mixing channel and a plurality of gas conduits formed in the body in parallel spaced relation to the mixing channel and connected thereto. A pair of annular ducts also are formed in the body adjacent its respective ends, with one of the pair connected to both the mixing channel and to each of the gas conduits, and the other of the pair connected to each of the gas conduits and being vented. A pair of valves are mounted in tandem for each of the gas conduits and means are provided to alternately open and close one of the pair of valves.

11 Claims, 3 Drawing Sheets

RADIAL GAS MANIFOLD

BACKGROUND OF THE INVENTION

1. Field of the Invention

The present invention relates generally to gas-mixing systems and, more particularly, to an improved radially designed gas manifold characterized by precise mixing and accurate admission of a plurality of gases into a processing chamber, as well as by rapid switching among the gases, yet occupying a minimum of dead space.

2. The Prior Art

Gas manifolds are used in gas-mixing system. A manifold is a linear assembly, such as a pipe fitting, with a plurality of valved inlets for connecting a plurality of fluid lines to a single processing chamber (i.e., several engine cylinders to a carburator), or for connecting one fluid line with a plurality of fluid outlet lines (as in a water distribution system). In the former, i.e., in the gathering of multipleline fluid inputs into a single intake chamber, the manifold is known as an intake manifold; and in the latter, i.e., in the division of a single fluid supply in several outlet streams, the manifold is described as a distribution manifold.

The invention herein primarily relates to an intake manifold, although it could be adapted, with modifications not disclosed herein, to distribution manifolds as well. Specifically, the invention relates to a gas intake manifold as used in industry. One such industrial use includes the semiconductor industry. specifically one involving the manufacture of high performance electronic and optoelectronic devices by epitaxial growth of compound semiconductors utilizing organometallic compounds. Such systems employ reaction chambers for metalorganic chemical vapor deposition (MOCVD) and gas-mixing systems to feed those chambers. In such systems, the flow of the several gases must be optimized and the manifold must be capable of achieving abrupt transitions among the several gases to effect the required changes between the deposited layers. One such CVD Reaction Chamber is disclosed in U.S. Pat. No. 4,596,208 granted to Spire Corporation, the common assignee herein, on June 24, 1986, the disclosure of which is incorporated herein by reference. In this patent, U.S. Pat. No. 4,596,208, a conventional linear assembly intake manifold is used. As such, the several gases are entering the manifold at different distances along the axial length of the manifold. Valving of gases into such linear manifold results either in an abrupt flow of the just valved gas or in non-uniform flow thereof until such time that a constant flow rate is reached. The time interval for the newly valved gas to reach its desired constant rate flow, however finite, does nevertheless adversely affect the deposition process. Further, gases admitted into the linear manifold farthest from the gas processing chamber have, of necessity, a longer distance to cover in the manifold than do gases valved thereto at points closer to the gas processing chamber. Consequently, great care must be exercised in adjusting the respective times for opening and closing the respective valves so as to achieve the desired confluence of the gases in the manifold before such gases do reach the gas processing chamber. Maintenance of such a linearly valved manifold system also is troublesome, requiring frequent cleaning and dismounting of the valves.

SUMMARY OF THE INVENTION

It is a principal object of the present invention to overcome the above disadvantages by providing an improved radially designed gas intake manifold designed for the precise mixing and accurate admission of a plurality of gases into a processing chamber, that allows for the abrupt switching among the input gases with minimal time delay, that also allows for easy access for clearing and/or dismantling of the valves, and one that is designed to occupy a minimum of dead space.

More specifically, it is an object of the present invention to provide an improved radially designed gas intake manifold essentially comprising a body, preferably a cylindrical body, having a mixing channel formed axially therethrough and a plurality of gas conduits formed in parallel spaced relation to the mixing channel and respectively connected thereto. One annular duct, designed to admit a carrier gas, is formed near one end of the body and with connections to both the mixing channel and to each of the gas conduits. A second annular duct, designed to admit a purge gas is formed near the other, the exit, end of the body with connections to each of the gas conduits and to a vent. Valves to control the flow of gases through the various gas conduits and-/or to control their admission into the mixing channel are designed in pairs and mounted in tandem for each one of the plurality of gas conduits. These valves are normally closed and preferably are pneumatically or electrically controlled with the aid of a plurality of solenoids. Means are provided alternately to open one or the other in each of the respective pairs of valves, allowing thereby the respective gas admitted into that particular gas conduit either to be purged, with the aid of the purge gas, from the manifold, or to be admitted, with the aid of the carrier gas, into the mixing channel of the manifold. Purging can be to a conventional scrubbing or a venting system, as desired. One end of the mixing channel is closed and the other is designed for ready connection to a processing chamber. Preferably, each of the plurality of gas conduits is provided with one or more heater elements designed to elevate, and to maintain so elevated, the inner walls thereof, and thus any gas contained therein, to a temperature of at least about 200° C., depending on the type of gas being valved therethrough. The operation of the means for the gas control valves preferably is under computer control, as for example by a microprocessor.

Other objects of the present invention will in part be obvious and will in part appear hereinafter.

The invention accordingly comprises the improved radially designed gas intake manifold of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
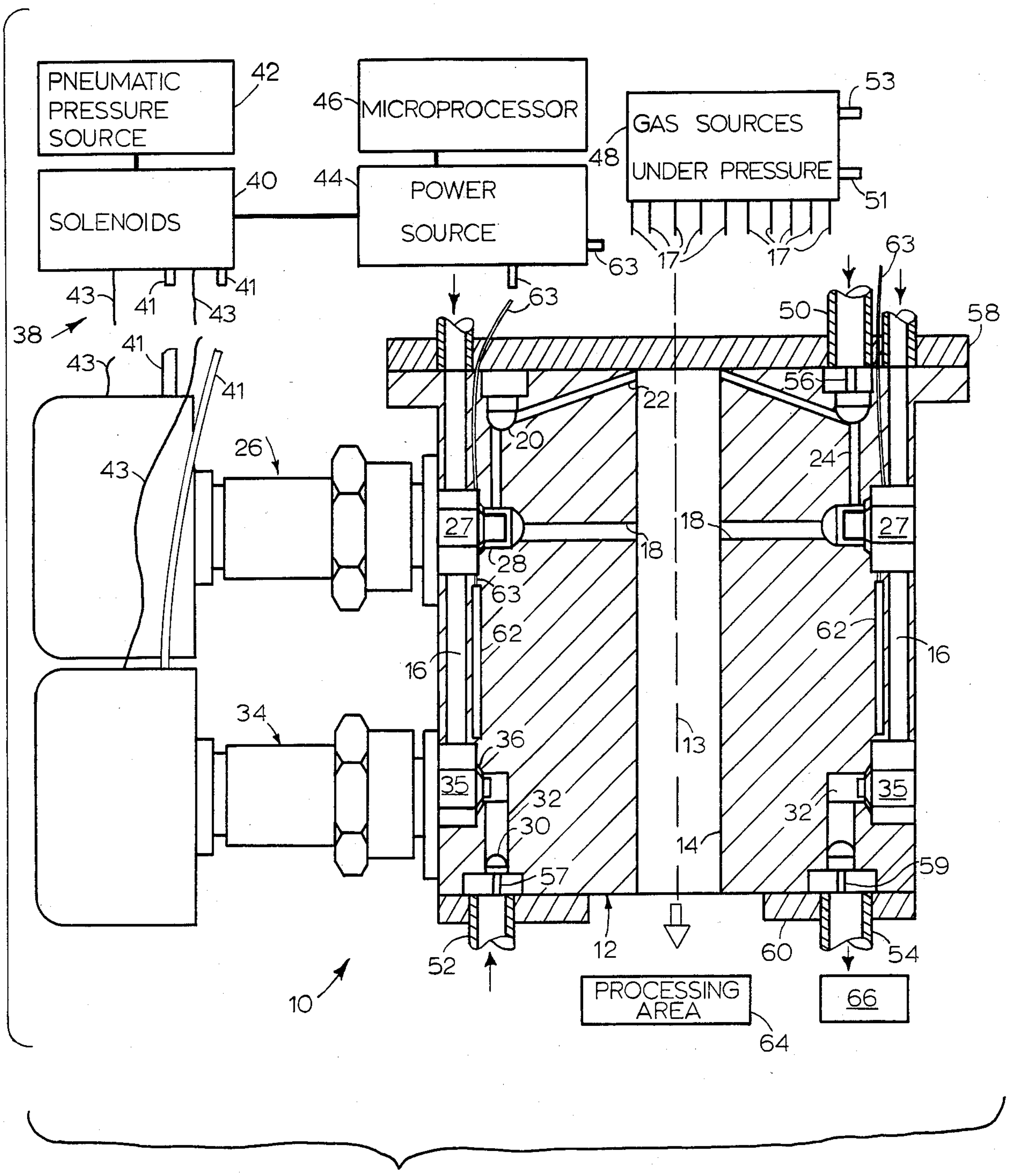
FIG. 1 is a fragmentary schematic section, partly in elevation and partly in block form, of a radially designed gas intake manifold constructed in accordance with the present invention.

A fragmentary schematic section, partly in elevation and partly in block form, of a radial gas intake manifold 10 constructed in accordance with the invention is illustrated in FIG. 1. The radial gas intake manifold 10 in general comprises a body 12, preferably of a cylindrical configuration and having a mixing channel 14 formed therethrough along its longitudinal axis 13. A plurality of gas conduits 16 also are formed in the body 12 in parallel spaced relation to the mixing channel 14. It is to be understood that the number of gas conduits 16 surrounding the mixing channel 14 will be equal to the maximum number of gases the manifold 10 has been designed to handle, and cay vary, as a practical matter, anywhere from six to twenty-four. Each of the gas conduits 16 is connected to the mixing channel 14 via a radial passage 18.

A first annular duct 20 is formed adjacent the top, the entrance, end of the body 12 and in a plane normal to the longitudinal axis 13 of the body 12. This first annular duct 20 also is provided with radial passages 22 connecting the duct 20 to the mixing channel 14, as well as with passages 24 connecting the duct 20 to each of the radial passages 18 of the gas conduits 16, at junctions 28. A first gas flow control valve 26, provided with a valve stem 27 closely fitting within the junction 28 when in the normally closed position, prevents the gas, admitted into that gas conduit 16 under pressure, from being admitted into the mixing channel 14. The gas flow control valve 26 does not inhibit the passage of gas in and through the gas conduit 16 and past the valve 26, however.

A second annular duct 30 is formed adjacent the bottom, the exit, end of the body 12, also in a plane normal to the longitudinal axis 13 thereof. This second annular duct 30 is provided only with passages 32 for connecting the duct 30 to each of the gas conduits 16 at junctions 36, which are axially spaced from the junctions 28 along the length of the conduits 16. A second gas flow control valve 34 is mounted in tandem with the valve 26 and forms an operative pair therewith for operating that particular gas conduit 16. This second gas flow control valve 34 also is provided with a valve stem 35 closely fitting within the junction 36 when in the normally closed position. Valve stem 35 prevents the gas, being under pressure within the conduit 16, from being admitted via the passage 32 into the second annular duct 30.

Means 38 are provided for operating the respective pairs of valves 26 and 34 arranged for each of the plurality of gas conduits 16. The valves 26 and 34 preferably are pneumatically or electrically operable valves via flexible air hoses 41 or wires, not shown. Both valves 26 and 34 are designed to be normally closed. When actuated, the valves 26 or 34 assume an open operative position by withdrawing their respective valve stems 27 or 35 from their respective junctions 28 or 36. By so doing, the gas in that particular gas conduit 16 is either going to be admitted into the mixing channel 14 or is going to be admitted into the second annular duct 30 and hence to be vented, as more fully described below.

It is pointed out that in the operative use of the manifold 10 of the invention, the means 38 is designed so as to alternatively open one or the other of each pair of valves 26 and 34 per each gas conduit 16 utilized during that particular mixing process, thus either admitting the particular gas therein into the mixing channel 14 or permitting it to be vented.

The means 38 for operating the plurality of pairs of valves 26 and 34 can comprise any suitable system. Preferably however, the means 38 is an adapted version of that described in said U.S. Pat. No. 4,596,208, assigned to the common assignee, and already incorporated herein by reference. Specifically, the means 38 includes a plurality of solenoids 40 designed to open the respective valves 26 or 34, when pneumatic, via the air hoses 41, which in turn are connected to a pneumatic pressure source 42. If the valves are electrically operable valves, the solenoids 40 are connected thereto via wires 43. A suitable power source 44 powers both the solenoids 40 and a dedicated microprocessor 46 programmed to control both the operation of the valves 26 and 34 and the operation of the MOCVD reaction chamber of which the radial gas manifold 10 of the invention is a part, all as described in said U.S. Pat. No. 4,596,208.

Figure 2:
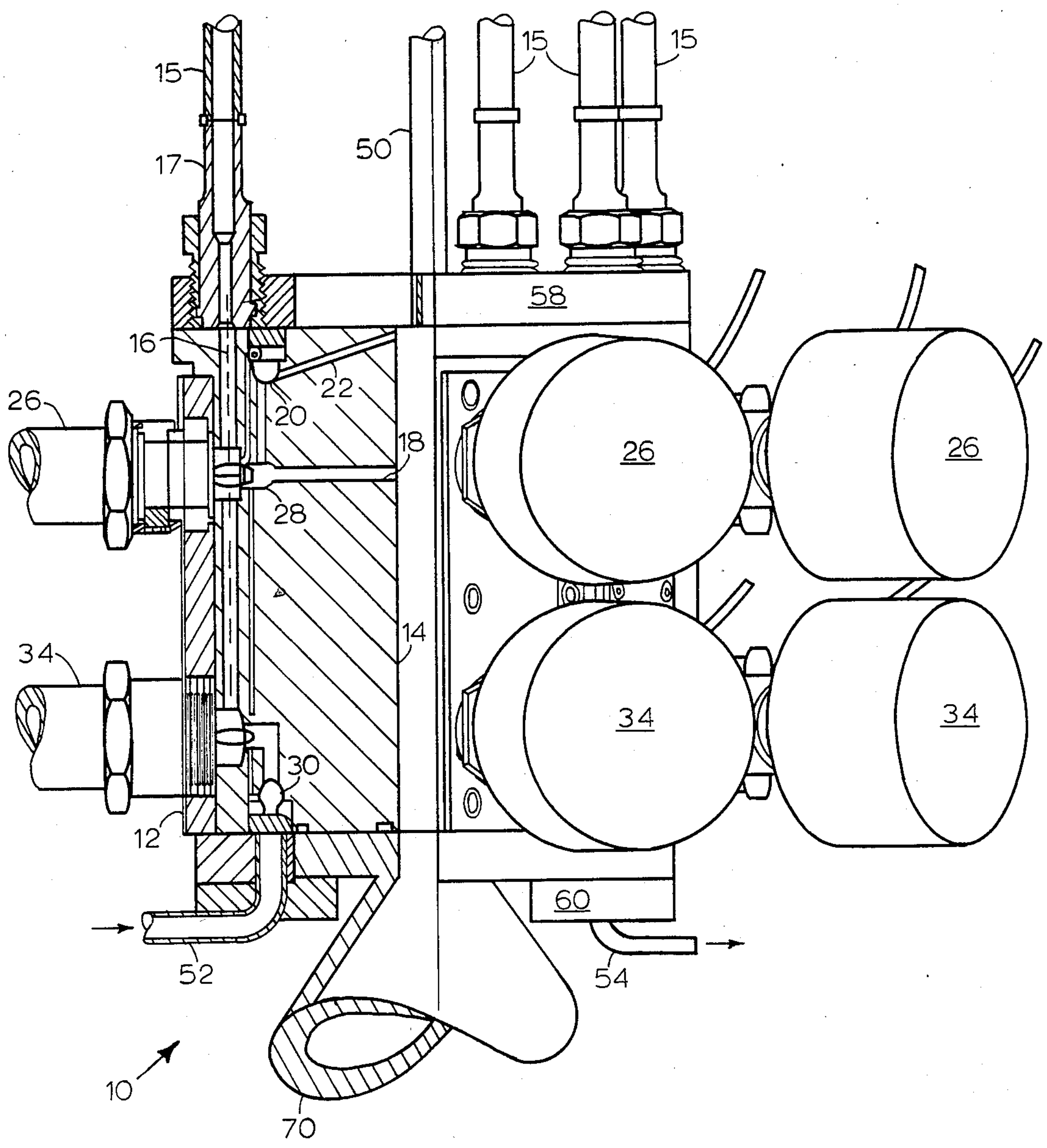
FIG. 2 is a view similar to FIG. 1 and showing a fragmentary section, partly in elevation, of the radially designed gas intake manifold of FIG. 1.

Each of the plurality of gas conduits 16 is respectively connected via a tubing 15 (FIG. 2) to a supply 48 of a respective metalorganic (MO) gas source under pressure, preferably bottled MO gas disposed in a rack near the radial gas manifold 10 in the MOCVD reaction chamber. Suitable fittings 17 connect the tubings 15 at both of their respective ends to the manifold 10 on the one hand and to the gas supply 48 on the other.

The body 12 of the radial gas manifold 10 further is provided with a pair of entrance ports 50 and 52, with port 50 designed to admit a carrier gas via a passage 56 into the first annular duct 20, and port 52 to admit a purge gas via a passage 57 into the second annular duct 30. The purge gas is continuously allowed to escape from duct 30 via a passage 59 connecting with an exit port 54. The exit port 54, in turn, is preferably connected to a suitable vent or scrubbing system 66, keeping thereby this lower portion of the gas manifold 10 clean. The carrier gas is obtained from the gas supply 48 via hose 51, and the purge gas via hose 53.

Figure 3:
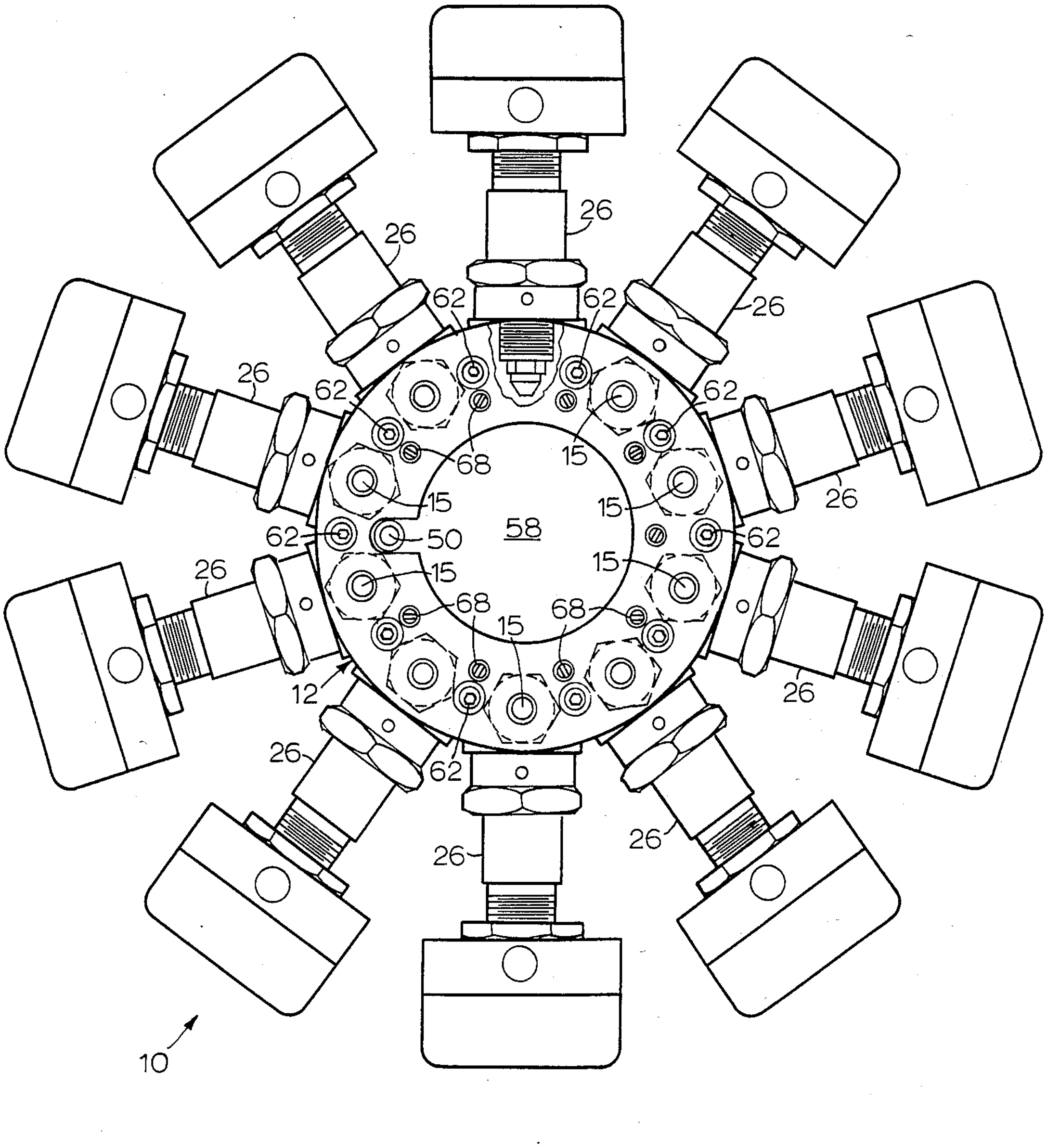
FIG. 3 is a plan view of the radially designed gas intake manifold constructed in accordance with the present invention.

A top plate 58, appropriately fastened to the top of the body 12 by a plurality of screws 68 (FIG. 3), effectively closes off one end, the top end, of the mixing channel 14. The open end of the mixing channel 14, which preferably is flared outwardly as at 70 (FIG. 2), is then connected to a processing area 64, such as a reaction chamber, or the like, as above stated. A bottom plate 60, secured to the body 12, is adapted to secure the radial gas manifold 10 in and to an appropriate processing system, of which it is a part. Preferably, the cylindrical body 12, the top plate 58 and the bottom plate 60 are formed of metal, such as stainless steel.

Preferably, each of the plurality of gas conduits 16 is provided with one or more heater elements 62 designed to elevate, and to maintain so elevated, the inner walls of the adjacent conduits 16, and thereby the gases contained therein, to the required operating temperature, which in the case of the MO gases is at least about 200° C. Preferably, the heater elements 62 are sheathed resistance wire heaters and connected to the power source 44 via insulated wires 63.

In operation, with the power, the gas supply and the air pressure properly connected and turned on, with all of the gas flow control valves 26 and 34 in their normally closed position, and with the several gases admitted into their respective gas conduits 16, the carrier gas admitted into the first annular duct 20 is allowed to enter the mixing channel 14 and to escape therefrom into the processing area 64, and the purge gas admitted into the second annular duct 30 is allowed to escape therefrom via the exit port 54 and into the vent or scrubbing system 66. These passages are thereby cleaned. During this time, the processing gases, such as the MO gases, remain under pressure in their respective gas conduits 16, however.

Then, preferably on command from the microprocessor 46, the respective one or more of the gas flow control valves 34 in each pair of valves 26 and 34 is opened. As a consequence, the particular processing gas or gases in the respective gas conduits 16 are allowed to escape from the manifold 10 via the second annular duct 30 and the exit port 54 to be vented into the vent or scrubbing system 66. This venting achieves two functions: (a) the escaping processing gases, in mixing with the purge gas admitted to the second annular duct 30 via the entrance port 52, continue to flush and clean these portions of the manifold 10; and (b) the escaping processing gases continue to be vented until they respectively reach their respective desired flow rate. Once a processing gas achieves its desired flow rate, the respective flow control valve 34 is closed and, simultaneously therewith, its respective associated flow control valve 26 is opened. Thus, the pairs of valves 26 and 34 operate and act in a flip-flop manner, i.e., when one valve of the pair is open, its associated valve is closed. With the flow control valve 26 now in the open condition, the processing gas in that particular gas conduit 16 is allowed to enter, aided by and together with the carrier gas from the first annular duct 20, into the mixing channel 14. There, the respective processing gases, some or all at their preselected elevated temperatures, are intermixed with one another. Aided by the flared section 70, the intermixed processing gases, together with the carrier gas, are then admitted into the processing area 64 for the purpose above noted.

Thus it has been shown and described an improved radially designed gas manifold 10 designed for the precise mixing and admission of a plurality of processing gases or the like into a processing area, which manifold 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A radial gas manifold comprising:
   (a) a body provided with a mixing channel therethrough;
   (b) a plurality of gas conduits formed in said body in parallel spaced relation to said mixing channel;
   (c) a radial passage connecting each of said plurality of gas conduits to said mixing channel;
   (d) a first annular duct having passages respectively connecting said duct to said mixing channel and to each of said plurality of gas conduits;
   (e) first valve means operatively disposed in each of said plurality of gas conduits at their junctions with said radial passages;
   (f) a second annular duct having passages for connecting said duct to each of said plurality of gas conduits at points axially spaced along the length of said conduits;
   (g) second valve means operatively disposed in each of said plurality of gas conduits at their junctions with said passages connecting to said second annular duct; and
   (h) means for operating said first and second valve means.

2. The radial gas manifold of claim 1 wherein said body is cylindrical and is provided with a top plate enclosing one end of said mixing channel, and a bottom plate surrounding the other end of said mixing channel.

3. The radial gas manifold of claim 2 wherein said cylindrical body, and said top and bottom plates are formed of stainless steel.

4. The radial gas manifold of claim 1 wherein said plurality of gas conduits can range in number from six to twenty-four and further including a source of gases intended to be mixed, said source provided with fittings and tubing by which it is respectively connected to said plurality of gas conduits.

5. The radial gas manifold of claim 1 wherein said first and second annular ducts are each provided with an entrance port, a source of carrier gas and a source of purge gas respectively connected to one of said entrance ports, and further including an exit port for said second annular duct.

6. The radial gas manifold of claim 1 wherein said first and said second valve means are pneumatically operable by said means, and further including a pneumatic source of pressure and a plurality of solenoids and flexible hoses for respectively connecting each of said first and said second valve means to said pneumatic source of pressure.

7. The radial gas manifold of claim 6 further including a source of power and a microprocessor respectively coupled to said pneumatic source of pressure and said plurality of solenoids and designed for respectively opening and closing said first and said second valve means under the control of said microprocessor and for respective time periods as determined by said microprocessor.

8. The radial gas manifold of claim 1 wherein said means allows for the rapid opening and closing of said first and second valve means, and wherein one each of said first and second valve means constitute a pair of operative valves arranged in tandem for each of said plurality of gas conduits, wherein one of said operative valves in each of said pair of operative valves is in a closed position whenever the other of said operative valves is in an open position.

9. The radial gas manifold of claim 1 further including a heater element for each of said plurality of gas conduits and designed to bring the inner walls of said gas conduits to a temperature of at least about 200° C.

10. The radial gas manifold of claim 8 wherein said heater element is a sheathed resistance wire disposed in parallel spaced relation to its respective one of said plurality of gas conduits substantially along its axial length.

11. The radial gas manifold of claim 1 wherein said first and said second valve means are electrically operable by said means, and further including a plurality of solenoids and wires for respectively connecting each of said first and said second valve means to a source of power.

* * * * *